United States Patent [19]

Austin

[11] Patent Number: 5,080,425

[45] Date of Patent: Jan. 14, 1992

[54] WINDOW ACCESSORY FOR A VEHICLE

[76] Inventor: Terry R. Austin, 541 W. Main St., Yukon, Okla. 73099

[21] Appl. No.: 543,138

[22] Filed: Jun. 25, 1990

Related U.S. Application Data

[63] Continuation-in-part of Ser. No. 526,153, May 18, 1990.

[51] Int. Cl.$^5$ .............................................. B60J 9/00
[52] U.S. Cl. .................................. 296/152; 296/37.8; 296/146; 52/208
[58] Field of Search ...................... 296/146, 37.8, 201, 296/152; D12/183; 52/208

[56] References Cited

U.S. PATENT DOCUMENTS

| | | | |
|---|---|---|---|
| D. 251,726 | 5/1979 | Smith et al. ...................... | D12/183 |
| 2,934,374 | 4/1960 | Mortenson ........................... | 296/37 |
| 3,249,382 | 5/1966 | Swithenbank ....................... | 296/24 |
| 3,521,403 | 7/1970 | Bouwkamp ......................... | 49/324 |
| 3,770,312 | 11/1973 | Shadburn .......................... | 296/28 |
| 3,912,323 | 10/1975 | Dancik ............................... | 296/23 |
| 4,090,582 | 5/1978 | Deschu ............................... | 181/150 |
| 4,393,753 | 7/1983 | Chatlos ............................... | 98/2.12 |
| 4,566,728 | 1/1986 | Theodore ........................... | 296/76 |
| 4,854,636 | 8/1989 | Greenhalgh et al. ............... | 296/201 |
| 4,892,346 | 1/1990 | Berlin ................................. | 296/37.6 |

Primary Examiner—Robert R. Song
Attorney, Agent, or Firm—Mary M. Lee

[57] ABSTRACT

The present invention is directed to a contoured window accessory for vehicles. The accessory is suited particularly for use in the rear view window space of a pickup truck or van. The accessory comprises a first panel integrally formed of a transparent material. The first panel preferably is wedge-shaped so that it protrudes from the vehicle. This gives the vehicle a sleek and stylish exterior appearance and at the same time creates additional usable space inside the vehicle. The window may further include a second panel also adapted for installation in the window space interior to the first panel. The second panel has apertures designed to support objects, such as the speaker components of a stereo system installed in the vehicle.

16 Claims, 3 Drawing Sheets

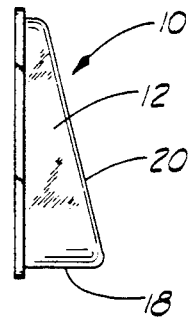
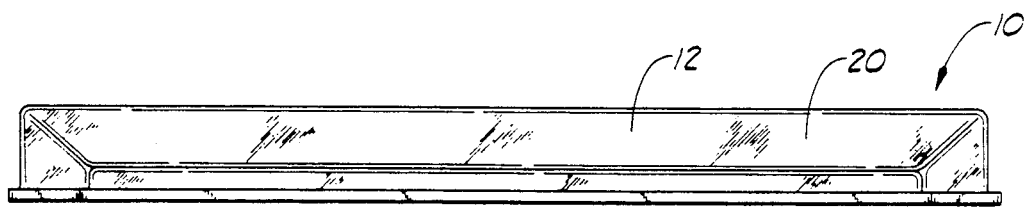
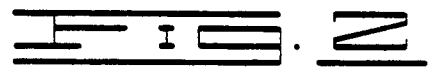
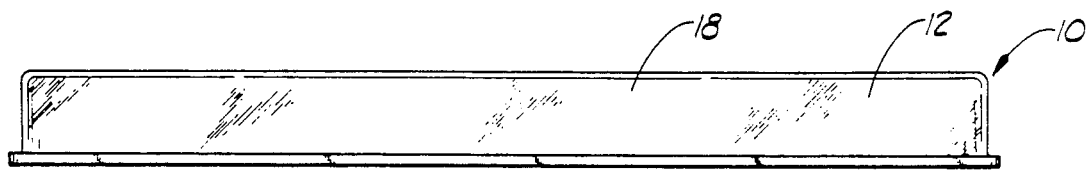
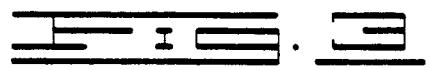
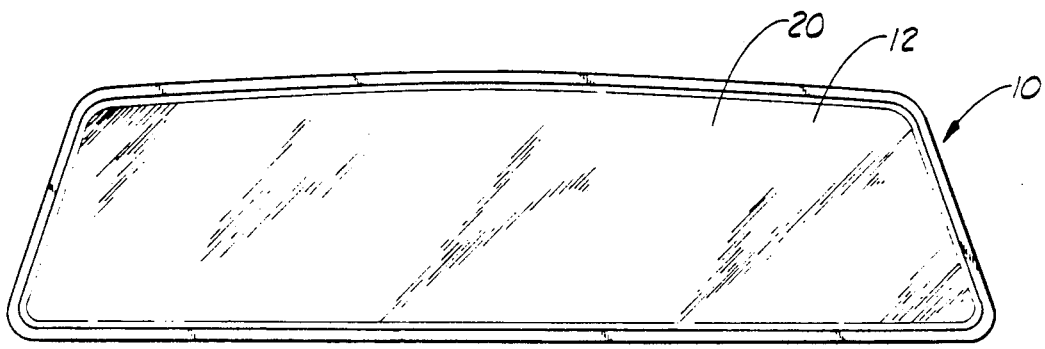

WINDOW ACCESSORY FOR A VEHICLE

This is a continuation-in-part of application Ser. No. 526,153, filed May 18, 1990, pending entitled "Vehicular Window."

FIELD OF THE INVENTION

The present invention relates generally to window accessories for vehicles and more particularly to accessories with usable space which are installable in the window space of vehicles.

SUMMARY OF THE INVENTION

The present invention comprises a window accessory for a vehicle. The window comprises a first integrally formed panel adapted for installation in a window space of a vehicle. The first panel is contoured to define a usable space which is formed in part by a substantially planar surface which is substantially horizontal when the window accessory is installed in a vehicle.

The present invention further comprises a window accessory for a vehicle which accessory has first and second panels. Both panels are adapted for installation in a window space of a vehicle, the second panel being interior to the first panel. The second panel has means therein suitable for supporting objects, and the panels are contoured so as to provide a space therebetween for receiving a portion of objects supported in the second panel.

The present invention further comprises a window accessory for a vehicle comprising stereo speaker components. The stereo speaker components are connectable to a player assembly. Also included are first and second panels adapted for installation in a window space of the vehicle. The second panel is interior to the first panel and has aperture means therein suitable for supporting at least one of the stereo speaker components. The first and second panels are contoured so as to provide a space therebetween for receiving a portion of the stereo speaker components supported in the second panel.

Still further, the present invention comprises a vehicle having a window accessory. The accessory comprises an integrally formed first panel installed in a window space of the vehicle. The first panel defines a usable space which is formed in part by a substantially horizontal, substantially planar surface.

Still further, the present invention comprises a vehicle having a window accessory comprising first and second panels installed in a window space of the vehicle. The second panel is interior to the first panel and has means therein suitable for supporting objects. The first and second panels are contoured to provide a space therebetween for receiving a portion of objects supported in the second panel.

BRIEF DESCRIPTION OF THE DRAWINGS

FIG. 1 is an end elevational view of a window accessory for a vehicle in accordance with the present invention.

FIG. 2 is a plan view of the accessory in FIG. 1.

FIG. 3 is a bottom view of the accessory of FIG. 1.

FIG. 4 is a rear or outside elevational view of the accessory shown in FIG. 1.

DETAILED DESCRIPTION OF THE PREFERRED EMBODIMENTS

The usable space inside the cab of a pickup truck is limited. One problem presented by the limited space in a truck cab is the lack of suitable space for stereo speakers. Typically, the speakers for stereo systems in truck cabs are placed in the dashboard, in the doors or behind the seat.

The window accessory of the present invention comprises an outer contoured panel and an inner apertured panel. When only the outer panel is used, the contoured shape provides additional usable space inside the vehicle. When both panels are used, the inner panel of the accessory provides a mounting for stereo speaker components which is acoustically superior to mountings currently used in the doors or behind the seats. With or without the inner panel, the contoured outer panel gives the truck a sleeker, more modern exterior appearance.

Figure 5:
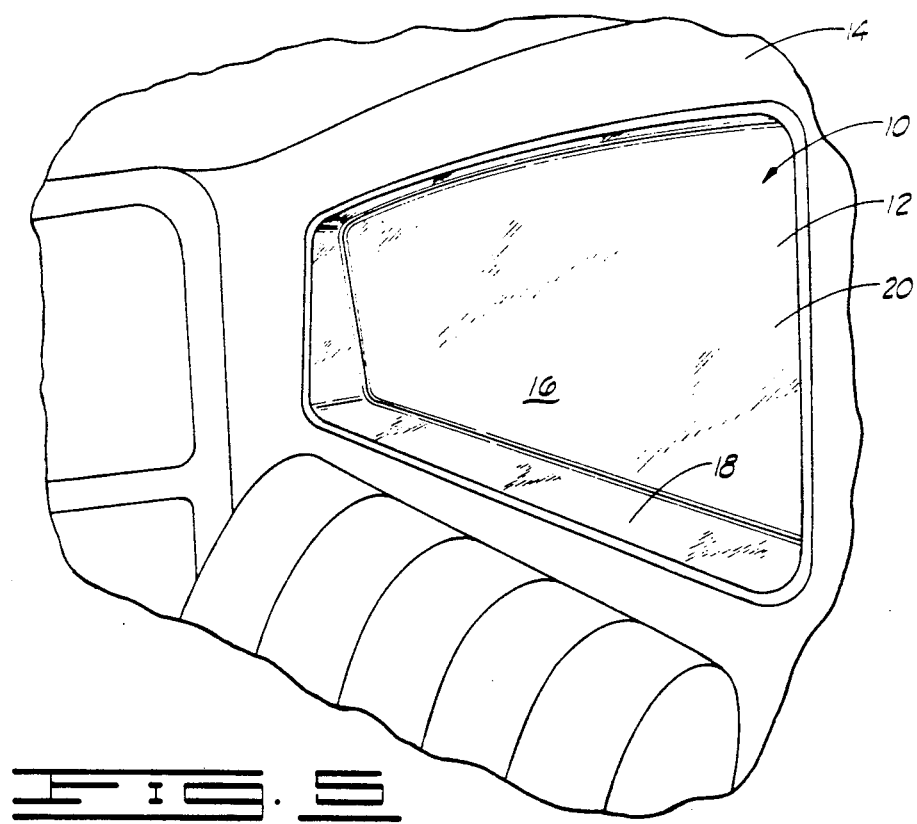
FIG. 5 is a perspective front or inside view of the window accessory shown in FIG. 1 installed in a pickup truck.

With reference now to the drawings in general and to FIGS. 1-5 in particular there is shown therein and designated by the reference numeral 10 a window accessory for a vehicle in accordance with the present invention. The window accessory comprises a first or outer panel which, as shown in FIG. 5, is adapted for installation in a window space of a vehicle, such as the pickup truck 14.

While the preferred embodiments of present invention are shown and described herein in the context of a pickup truck, it will be appreciated that the present invention would provide the same advantages to other vehicles, such as cars, vans, campers and trailers. Furthermore, while in these described embodiments the window space is the rear view window space of the vehicle, it will be apparent that the window accessory could be adapted equally well for use in other window spaces of the vehicle.

The outer panel preferably is formed of a transparent material such as acrylic plastic, or some other transparent material suitable for use as a vehicular window or windshield. A colored transparent material is often desirable, and in some instances opaque materials may be utilized.

The outer panel preferably is integrally formed from a single sheet of deformable material by one of several known methods. Suitable methods of forming sheets of deformable acrylic material include press molding and vacuum molding.

As best seen in FIG. 5, the outer panel 12 preferably is contoured to define a usable space 16. The usable space 16 may be formed in part by a substantially planar surface 18 which is formed in the window so as to be substantially horizontal when the window is installed. When so formed, the substantially horizontal, substantially planar surface 18 provides a convenient shelf inside the vehicle, which is positioned most advantageously near the bottom of the window space.

Figure 10:
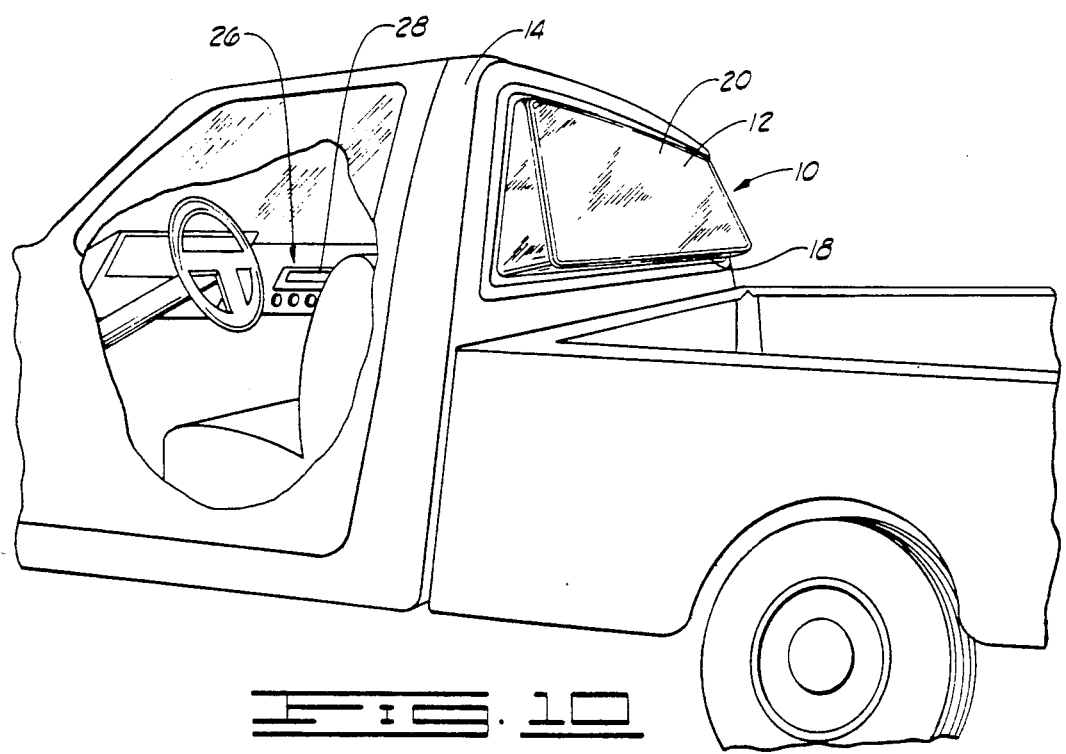
FIG. 10 is a rear or outside elevational view of the window accessory of either FIG. 1 or FIG. 6 installed in a pickup truck.

More preferably, the outer panel 12 is formed so as to have an oblique planar surface 20 adjoining the horizontal planar surface 18 to give the panel a wedge-shaped portion which protrudes from the vehicle 14 when the window accessory 10 is installed in a vehicle, as shown in FIG. 5 and also in FIG. 10. A window accessory with this configuration gives the vehicle a particularly sleek and modern appearance from the outside, especially in profile.

As depicted in FIGS. 6-9, the window accessory 10 preferably also is provided with a second or inner panel 22. The inner panel 22 preferably is integrally formed of a suitable transparent material, such as acrylic plastic, and may be formed by the same methods used to form the outer panel 12, described above. The second panel 22 similarly is adapted for installation in the window space of the vehicle 14 interior to the first outer panel 12.

Figure 7:
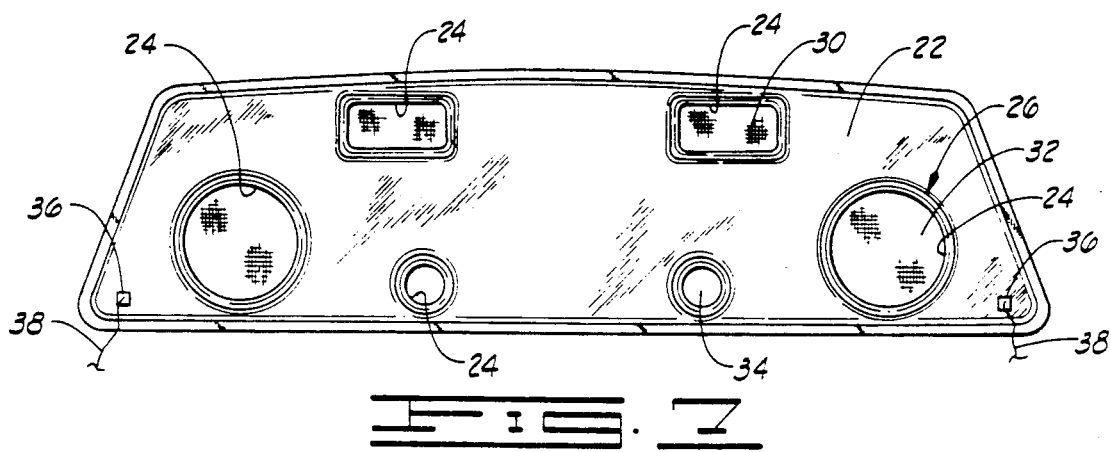
FIG. 7 is an inside elevational view of the window accessory shown in FIG. 6.
Figure 8:
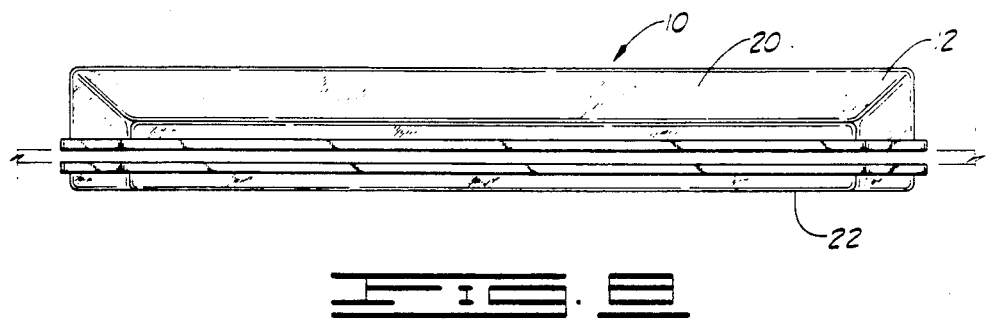
FIG. 8 is a plan view of the window accessory shown in FIG. 6.
Figure 9:
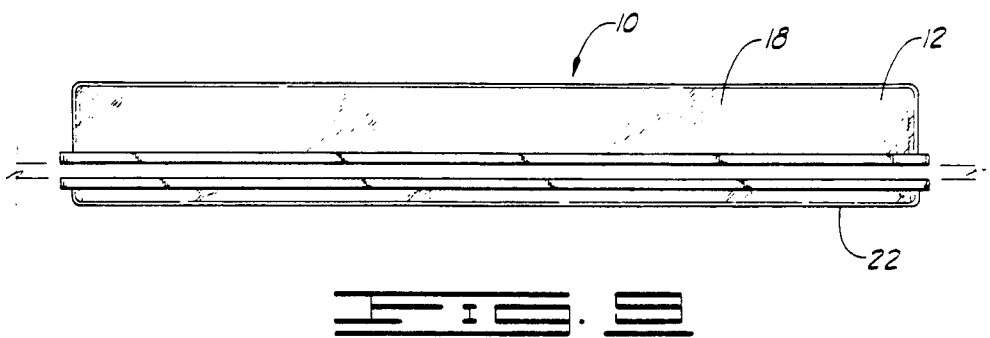
FIG. 9 is a bottom view of the window accessory shown in FIG. 6.

As best seen in FIG. 7, the inner panel 22 is provided with one or more apertures 24 for supporting objects. In the preferred embodiment, the apertures 24 in the inner panel 22 are designed to support speaker components of a stereo system 26 (FIG. 10).

Such stereo systems are well known and will not be described in detail herein. Stereo systems typically comprise a player assembly 28 (FIG. 10) of some sort. The player assembly may be a radio, which merely receives and plays incoming signals, or a cassette or compact disk player, or a combination of these devices. The stereo system 26 also usually includes speaker components, such a pair of tweeters 30 and a pair of woofers 32. Air passives 34 also are included in many speaker cabinets. The apertures 24 may be positioned to support the components 30, 32 and 34 in any suitable arrangement.

Figure 6:
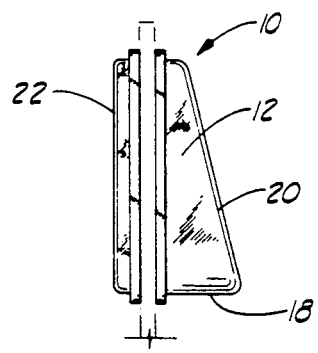
FIG. 6 is an end elevational view of a second embodiment of the window accessory of the present invention.

When the second inner panel 22 is included in the practice of the present invention to support objects, such as stereo speaker components, and when apertures are employed to support such components, the inner and outer panels 12 and 22 are contoured to provide a space therebetween to receive the rear portion of the speaker components. Even more preferably, the apertures are formed so as to permit the front surface of the components to be flush or slightly below the surface of the inner panel 22, as depicted in FIGS. 6 and 7.

As further shown in FIG. 7, another set of apertures may be provided in the second panel 22 for supporting connecting elements 36 by which the wires 38 from the speaker components may be connected to the player assembly 28 (FIG. 10). These are most conveniently placed in the lowermost and outermost corners of the window 10.

Now it will be appreciated that the present invention provides an attractive and useful window accessory for vehicles in general and for trucks in particular. The window accessory of this invention has a simple, stream-lined shape which enhances the exterior profile and the interior space of any vehicle. Because each of the panels of the window accessory may by integrally formed of a single sheet of deformable material, the window is easy to install in the vehicle using known methods and equipment and without modifying the body of the vehicle.

It will be understood that the present invention contemplates a replacement kit comprising a single or double-paneled accessory which can be substituted for the original window provided in a vehicle. A variety of ready-made kits can be produced to accommodate any make or model of vehicle. Similarly, such replacement kits can be designed to fit any brand or style of stereo speaker components. A replacement kit may be equipped with panels sized for any selected vehicle and with accompanying stereo speaker components.

Still further, vehicles can be manufactured or modified in accordance with this invention and used cars can be modified to incorporate the window accessory. This modification will increase the appeal and, therefore, the value of the vehicle.

Changes may be made in the combination and arrangement of the various parts, elements, steps and procedures described herein without departing from the spirit and scope of the invention as defined in the following claims.

I claim:

1. A window accessory for a vehicle comprising a first integrally formed panel adapted for installation in a window space of a vehicle, wherein the first panel is sized to occupy substantially the entire window space, wherein the first panel is contoured to define a usable space inside the vehicle, and wherein the usable space is formed in part by a substantially planar surface which is substantially horizontal when the accessory is installed in the vehicle.

2. The accessory of claim 1 wherein the horizontal planar surface of the first panel is disposed near the bottom of the window space and wherein the usable space further is defined by an oblique planar surface formed in the first panel and adjoining the horizontal planar surface so that the first panel has a wedge-shaped portion which, when the window is installed in a vehicle, protrudes from the vehicle.

3. The accessory of claim 1 further comprising a second panel also adapted for installation in the window space with the first panel and interior to the first panel, the second panel having means therein suitable for supporting objects.

4. The accessory of claim 3 wherein the means for supporting objects includes apertures for supporting stereo speaker components.

5. The accessory of claim 3 wherein the horizontal planar surface of the first panel is disposed near the bottom of the window space and wherein the usable space further is defined by an oblique planar surface formed in the first panel and adjoining the horizontal planar surface so that the first panel has a wedge-shaped portion which, when the window is installed in a vehicle, protrudes from the vehicle.

6. A window accessory for a vehicle comprising:
 a first panel adapted for installation in a window space of the vehicle; and
 a second panel also adapted for installation in the window space of the vehicle with the first panel and interior to the first panel, the second panel having means therein suitable for supporting objects.

7. The accessory of claim 6 wherein the space between the first and second panels is defined in part by a substantially horizontal, substantially planar surface in the first panel disposed near the bottom of the window space and wherein the usable space further is defined by an oblique planar surface formed in the first panel adjoining the horizontal planar surface, whereby the first panel has a wedge-shaped portion which, when the accessory is installed in the vehicle, protrudes from the vehicle.

8. A window accessory for a vehicle comprising:

stereo speaker components adapted for connection to a stereo player assembly;

a first panel adapted for installation in a window space of the vehicle;

a second panel adapted for installation in the window space of the vehicle with the first panel and interior to the first panel, the second panel having aperture means therein suitable for supporting at least one of the stereo speaker components; and wherein the first and second panel are contoured so as to provide a space therebetween for receiving a portion of stereo speaker components supported in the second panel.

9. The accessory of claim 8 wherein the space between the first panel and second panel is defined in part by a substantially horizontal, substantially planar surface in the first panel disposed near the bottom of the window space and wherein the usable space further is defined by an oblique planar surface formed in the first panel adjoining the horizontal planar surface, whereby the first panel has a wedge-shaped portion which, when the accessory is installed in the vehicle, protrudes from the vehicle.

10. A vehicle with a window accessory comprising a first integrally formed panel installed in a window space of the vehicle, wherein the first panel is sized to occupy substantially the entire window space, wherein the first panel defines a usable space inside the vehicle, and wherein the usable space is formed in part by a substantially horizontal, substantially planar surface in the first panel.

11. The vehicle of claim 10 further comprising a second panel installed in the window space of the vehicle with the first panel and interior to the first panel, the second panel having means therein suitable for supporting objects.

12. The vehicle of claim 11 further comprising a stereo installed in the vehicle, the stereo comprising a player assembly and speaker components connectable to the player assembly, and wherein at least one of the speaker components is supported by the object supporting means in the second panel.

13. The vehicle of claim 10 wherein the usable space of the first panel is defined in part by a substantially horizontal, substantially planar surface disposed near the bottom of the window space and wherein the usable space further is defined by an oblique planar surface formed in the first panel adjoining the horizontal planar surface, whereby the first panel has a wedge-shaped portion which protrudes from the vehicle.

14. A vehicle having a window accessory comprising:

a first panel installed in a window space of the vehicle; and a second panel installed in the window space of the vehicle with the first panel and interior to the first panel, the second panel having means therein suitable for supporting objects.

15. The vehicle of claim 14 wherein the space between the first panel and the second panel of the window accessory is defined in part by a substantially horizontal, substantially planar surface in the first panel disposed near the bottom of the window space and wherein the space further is defined by an oblique planar surface formed in the first panel adjoining the horizontal planar surface, whereby the first panel has a wedge-shaped portion which protrudes from the vehicle.

16. The vehicle of claim 14 further comprising:

a stereo installed in the vehicle, the stereo comprising a player assembly and speaker components connectable to the player assembly, and wherein at least one of the speaker components is supported by the object supporting means in the second panel.

* * * * *